US012609482B2

(12) United States Patent
Schwan et al.

(10) Patent No.: US 12,609,482 B2
(45) Date of Patent: Apr. 21, 2026

(54) UNIVERSAL HOUSING FOR COVERING CONTACT ELEMENTS

(71) Applicant: TE Connectivity Germany GmbH, Bensheim (DE)

(72) Inventors: Ralf Schwan, Bensheim (DE); Dominik Heiss, Bensheim (DE); Mike Iskra, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 329 days.

(21) Appl. No.: 18/460,728

(22) Filed: Sep. 5, 2023

(65) Prior Publication Data

US 2024/0079815 A1 Mar. 7, 2024

(30) Foreign Application Priority Data

Sep. 6, 2022 (DE) ..................... 10 2022 122 506.2

(51) Int. Cl.
*H01R 13/514* (2006.01)
*H01R 13/207* (2006.01)

(52) U.S. Cl.
CPC ......... *H01R 13/514* (2013.01); *H01R 13/207* (2013.01)

(58) Field of Classification Search
CPC ...... H01R 13/514; H01R 13/207; H01R 4/34; H01R 13/5202; H01R 13/502; H01R 13/40; H01R 13/52; H01R 13/516
See application file for complete search history.

(56) References Cited

U.S. PATENT DOCUMENTS

2018/0016818 A1 1/2018 Ishiguro et al.
2020/0176908 A1* 6/2020 Maesoba ................ H01R 12/58
(Continued)

FOREIGN PATENT DOCUMENTS

DE 20313501 U1 2/2004
EP 3985803 A1 4/2022
KR 20210128171 A 10/2021

OTHER PUBLICATIONS

Extended European Search Report for corresponding EP Application No. 23195300.1 dated Feb. 2, 2024 (9 pages).
(Continued)

*Primary Examiner* — Abdullah A Riyami
*Assistant Examiner* — Nader J Alhawamdeh
(74) *Attorney, Agent, or Firm* — Jay J. Hoette; Carroll, Hoette & Butscher, LLC

(57) ABSTRACT

A housing includes a first partial housing and a second partial housing which complement each other in an assembled state to form the housing. The first partial housing has a first conductor receptacle that receives a first electrical conductor and a first connection assembly for connecting the first electrical conductor to a first contact element, and is provided with a passage opening for a second contact element. The second partial housing has a second conductor receptacle that receives a second electrical conductor and a second connection assembly for connecting the second electrical conductor to the second contact element. The second partial housing is configured to abut against the first partial housing in the region of the passage opening. In the assembled state, the second conductor receptacle forms a common cavity with the passage opening.

20 Claims, 2 Drawing Sheets

(56) References Cited

U.S. PATENT DOCUMENTS

| | | | | |
|---|---|---|---|---|
| 2020/0194938 | A1* | 6/2020 | Jung | H01R 13/5205 |
| 2024/0063584 | A1* | 2/2024 | Wolfschmitt | H01R 13/6593 |
| 2024/0079815 | A1* | 3/2024 | Schwan | H01R 13/514 |

OTHER PUBLICATIONS

Office Action for corresponding KR Application No. 1020230117594 dated Mar. 10, 2025 (10 pages).

* cited by examiner

UNIVERSAL HOUSING FOR COVERING CONTACT ELEMENTS

CROSS REFERENCE TO RELATED APPLICATIONS

This application claims the benefit of DE Application No. 102022122506.2, filed 6 Sep. 2022, the subject matter of which is herein incorporated by reference in its entirety.

BACKGROUND OF THE INVENTION

The subject matter herein relates to housings for contact elements.

Housings can be used to cover contact elements, such as high-voltage contact elements. Some housing assemblies use a secure cover to cover the contact elements. The housing and the cover provide protection against touching and short circuits to protect the contact elements from external influences, for example, dirt or moisture. For some applications, the contact elements held by the housing may differ relative to one another. For example, contact elements of a charging system for an electric vehicle may have different contact elements for different standards for charging plugs. Different housings are designed to accommodate the different contact elements for the different applications adding design and manufacture costs.

BRIEF DESCRIPTION OF THE INVENTION

In one embodiment, a housing is provided for covering conductor-side connection points of at least two contact elements and for receiving in sections at least two electrical conductors and connection assemblies for connecting the electrical conductors to the contact elements. The housing includes a first partial housing and a second partial housing which complement each other in an assembled state to form the housing. The first partial housing has a first conductor receptacle, which is configured to receive, at least in sections, a first electrical conductor and a first connection assembly for connecting the first electrical conductor to a first contact element, and is provided with a passage opening for a second contact element. The second partial housing has a second conductor receptacle which is configured to receive, at least in sections, a second electrical conductor and a second connection assembly for connecting the second electrical conductor to the second contact element, and where the second partial housing is configured to abut against the first partial housing in the region of the passage opening. In the assembled state, the second conductor receptacle forms a common cavity with the passage opening.

In another embodiment, a housing assembly is provided including a housing and at least one contact housing element. The housing includes a first partial housing and a second partial housing which complement each other in an assembled state to form the housing. The first partial housing has a first conductor receptacle, which is configured to receive, at least in sections, a first electrical conductor and a first connection assembly for connecting the first electrical conductor to a first contact element, and is provided with a passage opening for a second contact element. The second partial housing has a second conductor receptacle which is configured to receive, at least in sections, a second electrical conductor and a second connection assembly for connecting the second electrical conductor to the second contact element, and where the second partial housing is configured to abut against the first partial housing in the region of the passage opening. In the assembled state, the second conductor receptacle forms a common cavity with the passage opening. The at least one contact housing element is configured such that it can be plugged together with the housing and with a first contact element receptacle which is configured to define a position for the first contact element and with a second contact element receptacle which is configured to define a position for the second contact element at a defined axial spacing from the first contact element, where the second contact element receptacle has an inner diameter which is smaller than an inner diameter of the passage opening in the first partial housing

DETAILED DESCRIPTION OF THE INVENTION

Figure 1:
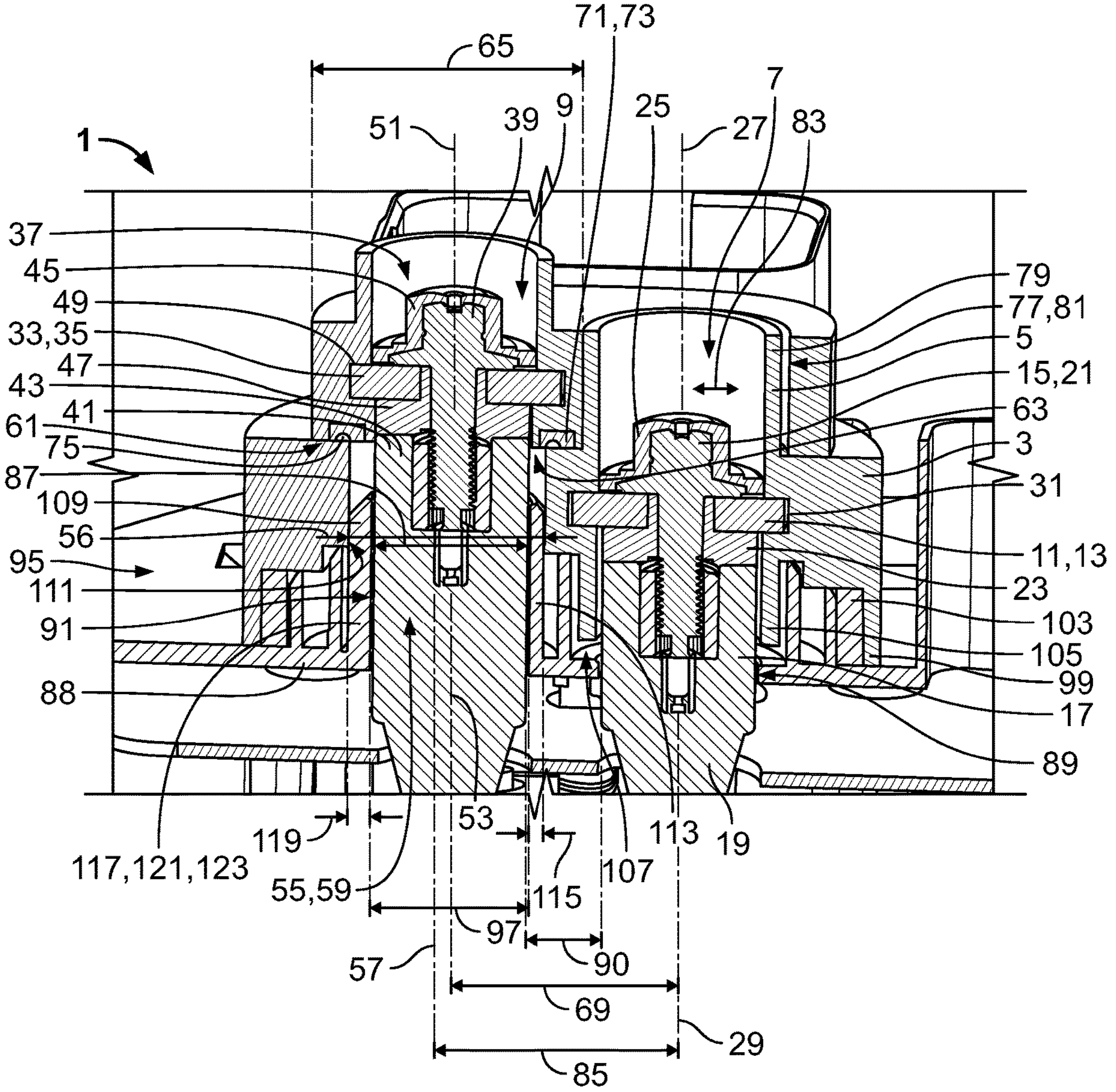
FIG. 1 shows a housing assembly in accordance with an exemplary embodiment in an assembled state with contact elements, conductors, connection assemblies, and a contact housing element in a sectional illustration in accordance with embodiments herein.
Figure 2:
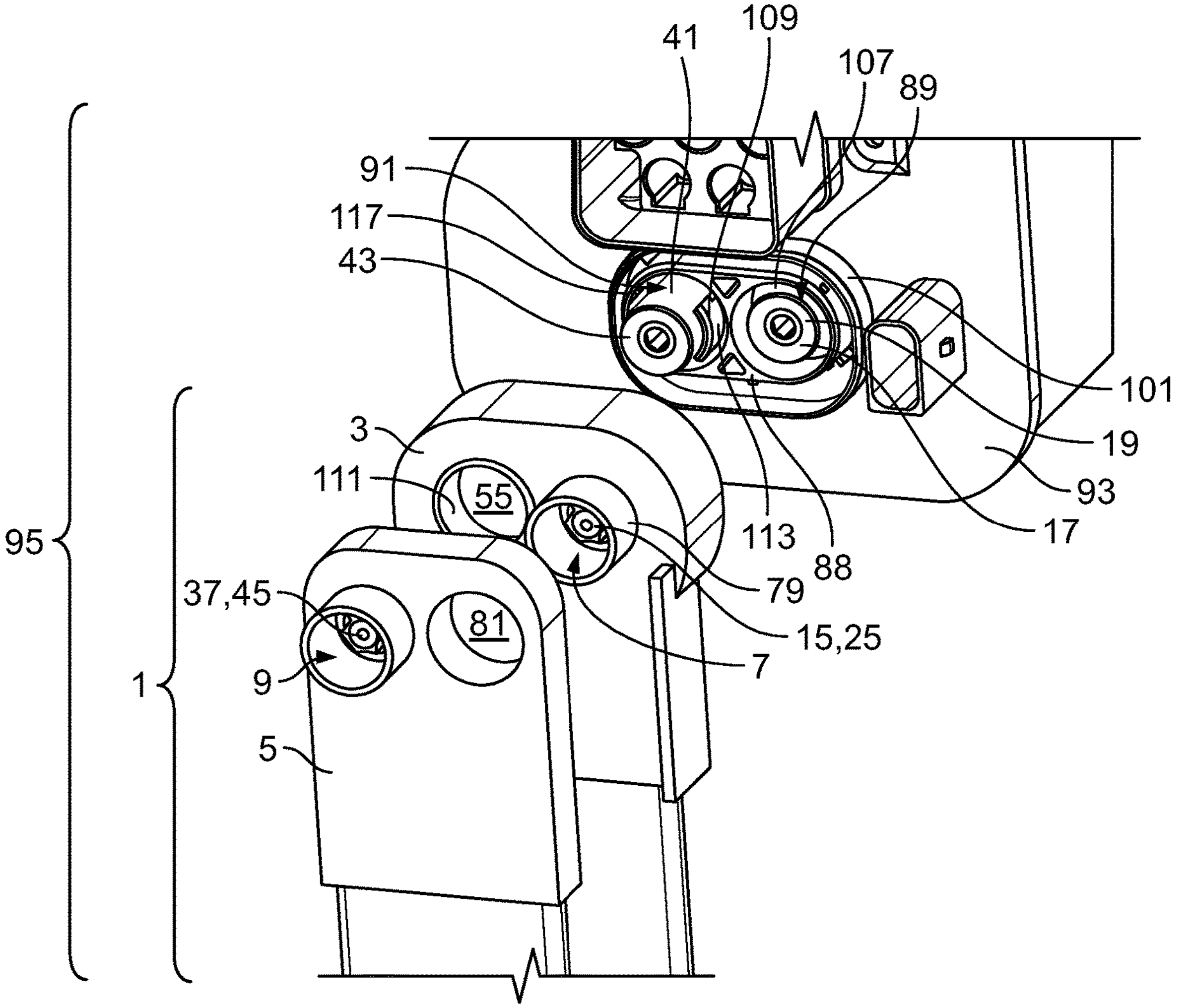
FIG. 2 shows the housing from FIG. 1 in a perspective illustration, where two partial housings of the housing are shown lifted off from the contact elements in accordance with embodiments herein.

FIG. 1 shows a housing assembly in accordance with an exemplary embodiment in an assembled state with contact elements, conductors, connection assemblies, and a contact housing element in a sectional illustration in accordance with embodiments herein. FIG. 2 shows the housing from FIG. 1 in a perspective illustration, where two partial housings of the housing are shown lifted off from the contact elements in accordance with embodiments herein. The housing assembly according to the subject matter herein is also described with reference to elements received in the housing, such as contact elements, electrical conductors, and connection assemblies. These elements do not necessarily have to be part of the housing. The reference to the elements mentioned serves only to better illustrate the embodiments of the housing described herein.

Housing 1 comprises a first partial housing 3 and a second partial housing 5. In the assembled state, as shown in FIG. 1, both partial housings 3 and 5 complement each other to form housing 1.

Each one of partial housings 3 and 5 has a conductor receptacle. First partial housing 3 has a first conductor receptacle 7 and second partial housing 5 has a second conductor receptacle 9.

Each conductor receptacle 7 or 9, respectively, is preferably formed by a cavity with a substantially cylindrical shape in respective partial housing 3 or 5, respectively.

Conductor receptacle 7 is used to receive at least a section of a first electrical conductor 11. First electrical conductor 11 is shown in FIG. 1 merely by way of example as a busbar 13. Alternatively, first conductor 11 can also be formed as a cable or as a conductor of another kind.

Also received in first conductor receptacle 7 is a first connection assembly 15 for connecting first electrical conductor 11 to a conductor-side connection point 17 of a first electrical contact element 9.

First connection assembly 15 is shown as a combination of a screw 21 with a sleeve 23 merely by way of example. Sleeve 23 can protrude into busbar 13 and can be arranged between busbar 13 and first electrical contact element 19.

Screw 21 can press busbar 13 and sleeve 23 against first contact element 19. A secure electrical connection can be established in this way between busbar 13 and first electrical contact element 19.

First connection assembly 15 can additionally have a screw head insulation 25 which protects screw 21 from being touched from the outside. Screw head insulation 25 can be dimensioned in such a way that it closes off first conductor receptacle 7 toward the outside.

First conductor receptacle 7 extends along first longitudinal axis 27. First longitudinal axis 27 preferably coincides with a longitudinal axis 29 of first contact element 19.

Preferably an undercut 31 extends to be transverse to longitudinal axis 27 from first conductor receptacle 7 into the material of first partial housing 3. Undercut 31 can serve to receive busbar 13.

When busbar 13 is received in undercut 31, busbar 13 is held in a positive-fit manner in first partial housing 3 and secured against a relative motion parallel to first longitudinal axis 27. This arrangement means that first partial housing 3 is also affixed in relation to first contact element 19.

Second conductor receptacle 9 is preferably formed to be similar to first conductor receptacle 7. Second conductor receptacle 9 is used to receive a second electrical conductor 33 which is preferably formed by a busbar 35.

Second conductor receptacle 9 additionally serves to receive a second connection assembly 37. Second connection assembly 37 can be structured to be substantially identical to first connection assembly 15. In other words, it preferably has a screw 39 which is configured to be screwed into a second contact element 41, in particular at a conductor-side connection point 43 of second contact element 41. First contact element 19 and second contact element 41 form a pair of contact elements.

Second connection assembly 37 preferably has a screw head insulation 45. Connection assembly 9 can also have a sleeve 47 which can improve the electrical connection between second conductor 33 and second contact element 41.

In second partial housing 5, an undercut 49 extends from second conductor receptacle 9 into the material of second partial housing 5 so that a positive fit between second electrical conductor 33 and second partial housing 5 can be established there as well.

Second conductor receptacle 9 preferably extends along a second longitudinal axis 51 which preferably coincides with a longitudinal axis 53 of second contact element 41 when second connection assembly 37 is connected to second contact element 41. Second longitudinal axis 51 preferably runs parallel to first longitudinal axis 27.

First partial housing 3 has a passage opening 55. Passage opening 55 extends along a longitudinal axis 57 through first partial housing 3. Longitudinal axis 57 runs parallel to first longitudinal axis 27 It preferably also runs parallel to longitudinal axis 51.

Longitudinal axis 57 can coincide with second longitudinal axis 51 and with longitudinal axis 53 of second contact element 41. However, this depends on the position of second contact element 41 and therefore on the position of second partial housing 5.

Passage opening 55 can be used to feed through and to receive second contact element 41. In the assembled state, second conductor receptacle 9 and passage opening 55 form a common cavity 59.

In the figures, common cavity 59 is filled because the figures show a situation in which second contact element 41 and second connection assembly 37 are disposed in common cavity 59.

Second partial housing 5 is configured to abut against first partial housing 3 in the region of passage opening 55. Common cavity 59 can be formed in this manner. At the same time, passage opening 55 and a second contact element 41 disposed therein can be protected.

Second partial housing 5 has a cover section 61 for the abutment against first partial housing 3. Cover section 61 is preferably ring-shaped and configured to cover the passage opening in first partial housing 3 at least in an edge region 63 thereof.

An outer diameter 65 of cover section 61 is preferably larger than an inner diameter 67 of passage opening 55. This can ensure that second partial housing 5 can always cover passage opening 55, regardless of the position of second contact element 41 in passage opening 55.

The position there refers to axis spacing 69 between longitudinal axes 29 and 53 of contact elements 19 and 41.

In order to obtain a connection which is sealed toward the outside between second partial housing 5, in particular its cover section 61, and first partial housing 3 in the region of passage opening 55, a sealing element 71 can be provided which can be arranged between two partial housings 3 and 5 in the region of passage opening 55.

One of two partial housings 3 or 5 is preferably provided with an axial sealing element 73 which can be received in a ring-shaped receptacle in the partial housing.

In the figures, second partial housing 5 is provided with such an axial sealing element 73 merely by way of example. In order to further improve the effect of sealing element 71, the oppositely disposed partial housing can be provided with a bead 75 that runs around passage opening 55 in a ring-shaped manner and that can press into sealing element 71 in the assembled state. In the example shown, bead 75 is formed on first partial housing 3.

As an alternative to axial sealing element 73, sealing element 71 can also be formed as a sealing disk or sealing ring which is arranged between the two partial housings.

In order to prevent second partial housing 5 from rotating about second longitudinal axis 51 when second connection assembly 37 is operated, second housing part 5 has a receptacle 77 which is spaced from second conductor receptacle 9 transverse to longitudinal axis 51.

A wall 79 of first conductor receptacle 7 can be received in receptacle 77 in the assembled state. Wall 79 is part of first partial housing 3 and projects out therefrom parallel to first longitudinal axis 27.

Receptacle 77 is preferably formed as a long hole 81, where a longitudinal direction 83 of long hole 81 extends parallel to an imaginary connecting line 85 between two longitudinal axes 29 and 53 of contact elements 19 and 41.

Housing 1 of the kind described above allows for two contact elements 19 and 41 to be received or covered, respectively, where housing 1 can be used for different axis spacings 69 of contact elements 19 and 41 from one another.

Second contact element 41 preferably has a diameter 87 which is smaller than inner diameter 56 of passage opening 55. Contact element 41 can therefore be received in passage opening 55 also with different axis spacings 69. Second partial housing 5 can nevertheless always abut against first partial housing 3, thereby covering passage opening 55 and additionally allowing second connection assembly 37 to fasten second conductor 33 to second contact element 41.

Due to the fact that cover section 61 of second partial housing 5 always covers passage opening 55 and due to the fact that receptacle 77 is formed as a long hole 81, second partial housing 5 can be used for different axis spacings 69. Housing 1 can therefore be used universally.

In order to define the relative positions of two contact elements 19 to one another, in particular to define a spacing 90 and thereby also axis spacing 69, at least one contact housing element 88, which has a first contact element receptacle 89 for first contact element 19 and a second contact element receptacle 91 for second contact element 41, can be provided.

Contact element receptacles 89 and 91 are used to define the positions of contact elements 19 and 41. Contact housing element 88 is preferably also used to fasten contact elements 19 and 41.

Contact housing element 88 can serve as a spacer for contact elements 19 and 41. It can be part of a larger housing 93.

Housing 1 and contact housing element 88 together form a housing assembly 95.

Second contact element receptacle 91 has an inner diameter 97 which is smaller than inner diameter 56 of passage opening 55. Inner diameter 97 can correspond approximately to diameter 87 of second contact element 41 so that second contact element 41 can be received without play in second contact element receptacle 91.

When housing 1 is connected to contact housing element 88, these two parts can be aligned with one another. First partial housing 3 preferably has a circumferential edge 99 into which a collar 101 of contact housing element 88 can be inserted. A circumferential sealing element 103 can be arranged between collar 101 and edge 99.

A sleeve-shaped wall 105 which surrounds first conductor receptacle 7 can extend away from first partial housing 3 in the direction toward contact housing element 88 and can be received in a ring-shaped receptacle 107 in contact housing element 88.

The relative position between first partial housing 3 and contact housing element 88 can be defined by edge 99, collar 101, wall 105, and receptacle 107. In addition, the position of first contact element 19 relative to first connection assembly 15 can be defined in this manner.

In order to define the position between second contact element 41 and housing 1, contact housing element 88 can have an alignment structure 109 which in the assembled state is arranged between second contact element receptacle 91 and an inner wall 111 of passage opening 55.

Alignment structure 109 is preferably configured such that it can be pushed into passage opening 55. It can surround second contact element receptacle 91 at least in sections. Alignment structure 109 can have a different thickness 115 on a side 113 which is closer to first contact element receptacle 89 than on a side 117 which is further away from first contact element receptacle 89 and on which alignment structure 109 has thickness 119.

In the embodiment shown by way of example, thickness 119 on side 117 is greater than thickness 115 on side 113. The side with the greater thickness can therefore have a thickening 121. Thickening 121 can be formed in particular by a rib 123 which preferably runs parallel to longitudinal axis 51.

If side 117, which is further away from first contact element receptacle 89, has greater thickness 119, for example, due to the presence of a rib 123, then spacing 90 between two contact elements 19 and 41 is smaller than in a case in which side 113, which is closer to first contact element receptacle 89, has greater thickness 115.

In particular in the case of a thickening 121 or a rib 123, a larger and a smaller spacing 90 of the contact elements from one another can be realized depending on whether thickening 121 is arranged on side 113 or on side 117.

A separate contact housing element 88 can be manufactured for each type of grid for two different spacings 90 of contact elements 19 and 41. In contrast, partial housings 3 and 5 of housing 1 can be structurally identical for different contact housing elements 88.

Housing assembly 95 described above makes it possible to use a uniform interface at housing 93 with same sealing element 103 for different contact spacings, i.e. axis spacings 69, of contact elements 19 and 41.

The subject matter herein relates to a housing for covering and for receiving, at least in sections, conductor-side connection points of at least two contact elements, in particular a pair of contact elements. The subject matter herein additionally relates to a housing assembly and a set, each comprising such a housing.

Housings of the kind mentioned above can be used to cover contact elements at least in sections. A secure cover is desired for contact elements, in particular for high-voltage contact elements, in order to provide protection against touching and short circuits and in order to protect the contact elements from external influences, for example, dirt or moisture.

Electrical conductors, for example cables or busbars, can be connected to conductor-side connection points of the contact elements. These connection points are to be protected by the housing according to the subject matter herein.

The contact elements can be part of a charging system for an electric vehicle. For example, the contact elements can be part of an on-board charging socket of an electric vehicle which are configured on the contact side for a plug connection with a charging plug and on the conductor side for connecting electrical conductors. It can happen that the arrangement of two contact elements relative to one another differs for different applications. This can be the case, for example, with different standards for charging plugs.

In an exemplary embodiment, a housing of the kind mentioned at the outset which can be used without structural changes to the housing for contact elements arranged differently from one another.

The housing is configured to cover the conductor-side connection points of at least two contact elements as well as to receive at least two electrical conductors at least in sections and connection assemblies for connecting the electrical conductors to the contact elements. The housing comprises a first partial housing and a second partial housing which complement each other in an assembled state to form the housing. The first partial housing has a first conductor receptacle, which is configured to receive at least in sections a first electrical conductor and a first connection assembly for connecting the first electrical conductor to a first contact element, and is additionally provided with a passage opening for a second contact element. The second partial housing has a second conductor receptacle which is configured to receive at least in sections a second electrical conductor and a second connection assembly for connecting the second electrical conductor to the second contact element. The second partial housing is also configured to abut against the first partial housing in the region of the passage opening. In the assembled state, the second conductor receptacle forms a common cavity with the passage opening.

Due to the fact that the housing consists of two partial housings and each partial housing is configured to receive an electrical conductor and a connection assembly for one of the respective contact elements, the two partial housings can be positioned at least in sections independently of one another and can be used for contact elements that are arranged differently from one another at least in sections. They nevertheless form a common housing.

The first contact element can there protrude into the first conductor receptacle and can be connected there to the first electrical conductor by the first connection assembly. The second contact element can be arranged so as to protrude through the passage opening in the first partial housing and be electrically connected to the second electrical conductor arranged in the second partial housing by the second connection assembly. The latter is possible in that the second connection assembly forms a common cavity with the passage opening when the housing is in the assembled state.

Since the housing according to the subject matter herein can be used for contact elements arranged differently relative to one another, production costs can be reduced because a separate housing does not have to be produced for each kind of predefined relative position of the contact elements. The housing according to the subject matter herein can therefore be used universally, at least for a predetermined range of different positions of two contact elements relative to one another. The different positions of the contact elements relative to one another can be realized in particular by spacings between the contact elements differing from one another or by axial spacings of the contact elements differing from one another.

The electrical conductors can be in particular busbars. As an alternative to this, other electrical conductors, in particular cables, can also serve as conductors. In particular, end sections of the electrical conductors can be arranged in the respective conductor receptacles. The conductor receptacles can be configured, in particular, to receive in sections the end sections of the respective conductors.

If the connection assemblies are arranged in the conductor receptacles, then the connection assemblies can close the conductor receptacles towards the outside.

The connection assemblies can have, for example, screw connections for screwing one electrical conductor each to a conductor-side end of a contact element. As an alternative to this, at least one of the connection assemblies can be configured to establish the connection between the conductor and the contact element, for example, by clamping, plugging, pressing, or crimping. A further alternative can be that the connection assembly comprises a soldering point or a welding point. The connection assemblies can be configured for permanent or detachable connection of the conductors to the contact elements.

The two conductor receptacles can extend along longitudinal axes which can coincide with longitudinal axes of the contact elements when the housing is attached to the contact elements to cover the latter. The longitudinal axes preferably run parallel to one another.

The solution according to the subject matter herein can be further improved with various configurations that are advantageous on their own and can be combined at random. These configurations and the advantages associated therewith shall be described hereafter. The housing according to the subject matter herein is also described with reference to elements received in the housing, such as contact elements, electrical conductors, and connection assemblies. These elements do not necessarily have to be part of the housing. The reference to the elements mentioned serves merely to better illustrate the configurations of the housing described.

At least one of the conductor receptacles is preferably configured to hold the conductor in a positive-fit manner along the longitudinal axis. For example, the conductor receptacle can be provided with at least one undercut for receiving the conductor, in particular a bus bar. If the conductor is then attached to the contact element, the partial housing is likewise automatically affixed to the contact element.

The passage opening can have an inner diameter which is larger than the outer diameter of a contact element which is intended to protrude through the passage opening. As a result, the housing according to the subject matter herein can be used for different pairs of contact elements that differ from one another in terms of their spacing. As a result, for example, a structurally identical housing can be employed for the use of contact elements with a 26 mm and a 27 mm grid. The grids relate to the axis spacings of the longitudinal axes of the two contact elements. Such grids are used, for example, for different charging sockets. The housing according to the subject matter herein makes it possible to dispense with designing and producing separate housings for the two grids.

A wall of the first conductor receptacle, in particular a cylindrical wall, can protrude out from the first partial housing and, in the assembled state, can be received in a receptacle in the second partial housing. The receptacle in the second partial housing can be formed in particular as a long hole, where a longitudinal direction of the long hole preferably extends transverse to an axial direction of the first conductor receptacle. Particularly preferably, a smallest inner diameter of the long hole corresponds substantially to an outer diameter of the wall so that the wall can be received without play in at least one direction in the long hole.

Receiving the wall in the long hole can secure the second partial housing to the first partial housing and prevent the second partial housing from rotating relative to the first partial housing. This can be advantageous when a connection assembly with a screw connection in the second partial housing is operated.

The long hole extends preferably parallel to the longitudinal axis of the second conductor receptacle through the second partial housing, where the longitudinal direction of the long hole extends perpendicular to the longitudinal axis. The longitudinal direction extends preferably parallel to an imaginary connecting line between the first and the second conductor receptacle in the assembled state.

In order to prevent the passage opening from being open to the outside, the second partial housing can have a cover section, in particular a ring-shaped one, which is configured to abut against the first partial housing in the region of the passage opening and to cover the passage opening in the first partial housing at least in an edge region thereof.

The cover section can form, in particular, an abutment surface. The cover section is formed particularly preferably in a complementary manner to a section of the first partial housing surrounding the passage opening.

An outer diameter of the cover section can be larger than an inner diameter of the passage opening in the first partial housing.

In order to obtain a tight connection of the two partial housings, at least in the region between the passage opening in the first partial housing and the second conductor receptacle in the second partial housing, the second partial housing is provided in the region of the cover section preferably with at least one sealing element, in particular with an axial sealing element.

The first partial housing particularly preferably has at least one, in particular ring-shaped, bead surrounding the passage opening, which in the assembled state abuts against the cover section of the second partial housing. If the second partial housing is provided with a sealing element, then the bead can be pressed against the sealing element in the assembled state. A contact pressure can be generated by the second connection assembly and can press the second partial housing against the first partial housing when the second connection assembly or the second conductor is arranged in a positive-fit manner in the second conductor receptacle and when the second connection assembly is attached to the second contact element.

As an alternative to the configurations described above, the second partial housing can be provided with a bead and/or the first partial housing with a cover section and/or with a sealing element.

In order to increase the safety of the contact elements arranged in the housing, the first and the second conductor receptacle are preferably separate from one another when the housing is in the assembled state in particular, the first conductor receptacle and the common cavity consisting of a passage opening and a second conductor receptacle can be separated from one another by the walls of the two partial housings surrounding the respective cavities. In order to obtain a simple structure and to be able to receive commercially available contact elements, the two conductor receptacles, preferably also the at least one passage opening, are provided with substantially circular cross-sections, where in particular regions of the conductor receptacles, that are configured for holding in a positive manner the electrical conductors, can differ from the circular cross-section.

The housing assembly according to the subject matter herein comprises a housing according to the subject matter herein and at least one contact housing element configured to be able to be plugged together with the housing. The contact housing element has a first contact element receptacle, which is configured to define a position for the first contact element, and a second contact element receptacle, which is configured to define a position for the second contact element at a defined distance from the first contact element. The second contact element receptacle there has an inner diameter which is smaller than an inner diameter of the passage opening in the first partial housing.

The contact housing element can serve in particular as a spacer between two contact elements. The contact housing element can therefore define the relative positions of the two contact elements in relation to one another.

Due to the inner diameter defined above, the second contact element can be arranged at different positions in the passage opening and nevertheless be connected to the second connecting element in the second conductor receptacle. This configuration allows for the housing to be used for different relative positions of the two contact elements, where the relative positions of the two contact elements is defined by the contact housing element.

A separate contact housing element can be necessary for every relative position of the two contact elements to one another. However, a housing of identical structure can always be used to cover the contact elements.

In the assembled state, the contact element receptacles are preferably arranged to be coaxial with the respective conductor receptacles.

The contact housing element and the housing are preferably configured to be complementary to one another. Particularly preferably, the contact housing element and the housing can be configured to be plugged into one another. The contact housing element can be part of a housing onto which the housing, consisting of the two partial housings, can be plugged as a cover.

The housing assembly can further comprise at least one alignment structure which, in the assembled state, is arranged between the second contact element receptacle and an inner wall of the passage opening.

The alignment structure can be arranged in particular without play between the second contact element and the inner wall of the passage opening. The alignment structure can define the position of the second contact element relative to the first partial housing, in other words within the passage opening.

The alignment structure is preferably configured such that it can be pushed into the passage opening. The alignment structure can surround the second contact element receptacle at least in sections.

The at least one alignment structure can be configured to be connectable to the contact housing element or can be formed to be monolithical therewith. The at least one alignment structure is preferably formed to be monolithical with the contact housing element, in particular as part of a larger housing.

In order to define the distance from the second contact element to the first contact element in a particularly simple manner using the at least one alignment structure, the at least one alignment structure can have a different thickness on a side of the second contact element receptacle which is closer to the first contact element receptacle than on a side which is further away from the first contact element receptacle. The thickness preferably extends along a radial direction in relation to the longitudinal axis of the second contact element receptacle, in particular parallel to an imaginary connecting line between the two contact element receptacles. The alignment structure can therefore have a thickening on at least one side of the second contact element receptacle.

The thickness can be created in a particularly simple manner in that the at least one alignment structure has at least one rib on the side with the greater thickness, in particular a rib for the abutment against the inner wall of the passage opening. The rib runs preferably parallel to the longitudinal axis of the second contact element receptacle. The rib can represent a thickening.

In addition to a housing of the kind mentioned above, the set according to the subject matter herein comprises two contact housing elements, where an axis spacing between the first and the second contact element receptacle is different for the two contact housing elements. The two contact housing elements can therefore be used for assemblies in which the two contact elements are spaced differently from one another. Identical housings, each consisting of the two partial housings, can be used for both.

The different contact housing elements can be obtained in a simple manner in that each contact housing element is provided with an alignment structure, where each alignment structure is provided with a thickening, in particular a rib, and where the thickening of one contact housing element is arranged to face towards the first contact element receptacle and the thickening of the other contact housing element is arranged to face away from the first contact element receptacle.

The subject matter herein has been described by way of examples using an advantageous embodiment with reference to the drawings. The combination of features shown by way of example in the embodiment can be supplemented by further features in accordance with the above statements in accordance with the properties of the housing according to the subject matter herein that are necessary for a specific application. Individual features can also be omitted in the embodiment described, such as where the effect of this feature is irrelevant in a specific case of application. The same reference numerals in the drawings may be used for elements having the same function and/or the same structure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A housing for covering conductor-side connection points of at least two contact elements and for receiving in sections at least two electrical conductors and connection assemblies for connecting said electrical conductors to said contact elements comprising:

a first partial housing and a second partial housing which complement each other in an assembled state to form said housing, where said first partial housing has a first conductor receptacle and a first passage opening arranged adjacent the first conductor receptacle, the first conductor receptacle is configured to receive, at least in sections, a first electrical conductor and a first connection assembly for connecting said first electrical conductor to a first contact element, where said second partial housing has a second conductor receptacle and a second passage opening arranged adjacent the second conductor receptacle, the second conductor receptacle is configured to receive, at least in sections, a second electrical conductor and a second connection assembly for connecting said second electrical conductor to a second contact element, and where said second partial housing is configured to abut against said first partial housing in the region of said first passage opening and said second passage opening, and, in the assembled state, said second conductor receptacle forms a common cavity with said first passage opening and said first conductor receptacle forms a common cavity with said second passage, both of said first and second conductor receptacles being open rearward of the first and second partial housings to access said first and second connection assemblies from rearward of the first and second partial housings for connection to said first and second contact elements, respectively.

2. The housing according to claim 1, where a wall of said first conductor receptacle protrudes out from said first partial housing and, in the assembled state, is received in a receptacle in said second partial housing.

3. The housing according to claim 2, where said receptacle in said second partial housing is formed as a long hole.

4. The housing according to claim 1, where said second partial housing has a cover section which is configured to abut against said first partial housing in the region of said passage opening and to cover said passage opening in said first partial housing at least in an edge region thereof.

5. The housing according to claim 4, where said second partial housing is provided in the region of said cover section with at least one sealing element.

6. The housing according to claim 4, where said first partial housing has at least one bead surrounding said passage opening which in the assembled state abuts against said cover section of said second partial housing.

7. The housing according to claim 1, where said first and said second conductor receptacle are separated from each other when said housing is in the assembled state.

8. The housing according to claim 1, further comprising said first conductor and said first connection assembly in said first conductor receptacle and said second conductor and said second connection assembly in said second conductor receptacle.

9. A housing assembly comprising:

a housing including a first partial housing and a second partial housing which complement each other in an assembled state to form said housing, where said first partial housing has a first conductor receptacle, which is configured to receive, at least in sections, a first electrical conductor and a first connection assembly for connecting said first electrical conductor to a first contact element, and is provided with a passage opening for a second contact element, and where said second partial housing has a second conductor receptacle which is configured to receive, at least in sections, a second electrical conductor and a second connection assembly for connecting said second electrical conductor to said second contact element, and where said second partial housing is configured to abut against said first partial housing in the region of said passage opening, and, in the assembled state, said second conductor receptacle forms a common cavity with said passage opening; and at least one contact housing element which is configured such that it can be plugged together with said housing and with a first contact element receptacle which is configured to define a position for said first contact element and with a second contact element receptacle which is configured to define a position for said second contact element at a defined axial spacing from said first contact element, where said second contact element receptacle has an inner diameter which is smaller than an inner diameter of said passage opening in said first partial housing.

10. The housing assembly according to claim 9, further comprising at least one alignment structure which, in the assembled state, is arranged between said second contact element receptacle and an inner wall of said passage opening.

11. The housing assembly according to claim 10, where said at least one alignment structure is configured to be connectable to said contact housing element.

12. The housing assembly according to claim 10, where said at least one alignment structure is configured to formed to be monolithical therewith.

13. The housing assembly according to claim 10, where said at least one alignment structure has a different thickness on a side of said second contact element receptacle which is closer to said first contact element receptacle than on a side of said second contact element receptacle which is further away from said first contact element receptacle.

14. The housing assembly according to claim 9, further comprising a respective contact element in each contact element receptacle.

15. The housing assembly according to claim 9, wherein said at least one contact housing elements includes a first contact housing element and a second contact housing element, where said axis spacings between said first and said second contact element receptacles are different for said first and second contact housing elements.

16. The housing assembly according to claim 15, where each contact housing element is provided with an alignment structure, where each alignment structure is provided with a thickening on said second contact element receptacle, and where said thickening of said first contact housing element is arranged to face toward said first contact element receptacle and said thickening of said second contact housing element is arranged to face away from said first contact element receptacle.

17. The housing assembly according to claim 9, where a wall of said first conductor receptacle protrudes out from said first partial housing and, in the assembled state, is received in a receptacle in said second partial housing.

18. The housing assembly according to claim 9, where said second partial housing has a cover section which is configured to abut against said first partial housing in the region of said passage opening and to cover said passage opening in said first partial housing at least in an edge region thereof.

19. The housing assembly according to claim 9, where said first and said second conductor receptacle are separated from each other when said housing is in the assembled state.

20. The housing assembly according to claim 9, further comprising a first conductor and a first connection assembly in said first conductor receptacle and a second conductor and a second connection assembly in said second conductor receptacle.

* * * * *